United States Patent [19]

Phillips et al.

[11] Patent Number: 4,963,703
[45] Date of Patent: Oct. 16, 1990

[54] COORDINATE DETERMINING DEVICE USING SPATIAL FILTERS

[75] Inventors: Mark J. Phillips, Wayland; Patrick T. Philbin, Waltham, both of Mass.; Barry A. Blesser, Raymond, N.H.

[73] Assignee: Numonics Corporation, Montgomeryville, Pa.

[21] Appl. No.: 381,765

[22] Filed: Jul. 18, 1989

[51] Int. Cl.$^5$ .............................................. G08C 21/00
[52] U.S. Cl. ...................................................... 178/19
[58] Field of Search .................................. 178/19, 18

[56] References Cited

U.S. PATENT DOCUMENTS

| | | | |
|---|---|---|---|
| 3,535,447 | 11/1967 | Wollrich | 178/19 |
| 3,647,963 | 3/1971 | Bailey | 178/19 |
| 3,705,956 | 1/1972 | Dertouzos | 178/18 |
| 3,732,369 | 5/1973 | Cotter | 178/18 |
| 3,735,044 | 5/1973 | Centner et al. | 178/19 |
| 3,801,733 | 4/1974 | Bailey | 178/19 |
| 3,975,592 | 8/1976 | Carvey | 178/18 |
| 4,009,338 | 2/1977 | Dym et al. | 178/18 |
| 4,088,842 | 5/1978 | Ikedo | 178/19 |
| 4,368,351 | 1/1983 | Zimmer | 178/19 |
| 4,471,162 | 9/1984 | Aono et al. | 178/19 |
| 4,577,057 | 3/1986 | Blesser | 178/18 |
| 4,644,102 | 2/1987 | Blesser et al. | 178/19 |
| 4,704,501 | 11/1987 | Toguchi et al. | 178/19 |

FOREIGN PATENT DOCUMENTS 0012138 12/1978 European Pat. Off. .
2080539 2/1982 United Kingdom .

OTHER PUBLICATIONS

Japanese Abstract No. 58-127280 (Morita).

Primary Examiner—Stafford D. Schreyer
Attorney, Agent, or Firm—Robert M. Asher

[57] ABSTRACT

A digitizing tablet is disclosed in which two sets of circuitous conductive lines form grids each connected at one end to a surrounding conductive loop. All outputs are measured from the conductive loop as a multiplexor sequentially grounds the grids one at a time. The outputs are fed through linear spatial filters which are used to produce intermediate signals which are in turn combined to arrive at raw position signals for a position indicating coil located over the work surface. Separate sets of linear spatial filters may be used to produce two raw position signals differently responsive to tilt which can then be combined to arrive at a true position signal insensitive to tilt.

9 Claims, 7 Drawing Sheets

COORDINATE DETERMINING DEVICE USING SPATIAL FILTERS

BACKGROUND OF THE INVENTION

The present invention relates to an electronic device for determining the position coordinates of a position indicating implement over a tablet surface.

Digitizing tablet systems are well known in the art and are used in a variety of applications. These systems generally include a tablet, a position indicating implement and associated electronics for producing some form of interaction between the implement and the tablet from which is derived digital data signals representing the position of the implement on the tablet.

A number of these systems employ a tablet having a grid of individual loops, one set of loops being aligned for indicating position in one coordinate direction and a second set of loops positioned for determining position in a second coordinate. One example of such a system is described in U.S. Pat. No. 4,644,102 (Blesser, et al.). Here, each loop is a discrete sensor for sensing the intensity of the current or voltage induced by the coil or coils of the position indicating implement. The system takes advantage of the basic magnetic equations which relate the field intensity of the induced current to the location of the electric coils. Generally the intensity will be in the form of a parabola in the region of interest. One determines the location of the coils by determining the intensity of the current sensed in the parallel conductive loops.

A second method commonly used for forming the grid on a digitizing tablet is described in U.S. Pat. No. 3,647,963 (Bailey). Bailey described the use of a pair of grids for each position coordinate. A grid included an outer loop which surrounds the tablet surface and a circuitous conductive line which extends from one corner of the outer loop to an opposite corner of the loop. The conductive line circuitously winds its way back and forth across the digitizing tablet forming a series of parallel conductive loop regions. An output signal is taken from a lead attached to the outer loop and a second lead attached to the circuitous conductive line. By offsetting two of such grids in each the X and Y directions, sufficient information can be gathered to identify the position of an electric coil in two dimensions.

In the art of digitizing tablets, generally, variations in spatial relationships are achieved through altering the design of the grid sense system. It is an object of the present invention to produce different spatial geometries, which in many cases are not physically achievable using the old methods, through the use of linear spatial filters on the signals from a single tablet design.

It is a further object of the present invention to provide a digitizing tablet which determines position of the tip of a position indicating stylus having an electric coil despite tilting of the stylus. It is a still further object of the present invention to measure and report the tilt of the stylus.

SUMMARY OF THE INVENTION

The invention is directed to a digitizing tablet for use with a position indicating implement. Spatially dependent data signals produced by the electromagnetic coupling of the implement and the table are fed through two different sets of linear spatial filters. Each set of filters produce a different set of intermediate position signals. The intermediate sets are each used to generate a raw position signal. The two raw position signals can be combined to generate a true position signal from which tilt or nonlinearity errors have been removed.

The tablet itself has a conductive loop surrounding the tablet work surface. A first coordinate direction is measured by a first plurality of circuitous conductive lines, each connected to a corner of the surrounding loop and forming a series of parallel loop sections offset from one another. A second plurality of circuitous conductive lines connected to the surrounding loop at one end are likewise provided for a position measurement in a second direction. A multiplexor is connected to the free ends of all of the circuitous conductive lines and selectively connects each conductive line to ground. Output signals are taken directly from the surrounding loop. Measurements taken from the surrounding loop are processed through the spatial filters to calculate the position of the position indicating implement.

A spatial filter is one that takes data from different spatial regions as for example a plurality of sensors having different locations or different shapes. The data is often detected by means of amplifiers, demodulators, and analog-to-digital converters. A linear spatial filter as used herein means a standard linear finite-impulse-response filter. See *Digital Processing* by Oppenheim and Schaefer, Prentice-Hall, Englewood Cliff,, New Jersey, 1975, chapter 4.5, page 155 for a tutorial on equivalent implementations of this class of filter. Such filters have the property that each of the plurality of inputs is scaled (multiplied) by a fixed coefficient and the resulting products are all combined through addition or subtraction to obtain an output.

The use of spatial filters advantageously permits spatial geometries which are difficult or impossible to achieve through physical grid layout. A single loop combines with equal weight all magnetic flux within the loop. Magnetic fields outside the loop are not counted. Thus, physically a loop provides either a +1 or zero coefficient. A linear spatial filter on the other hand can scale or multiply various of the data signals by a constant having a fractional contribution.

Other objects and advantages of the invention will become apparent during the following description of the presently preferred embodiment of the invention taken in conjunction with the drawings.

DETAILED DESCRIPTION OF THE PREFERRED EMBODIMENT

Figure 1:
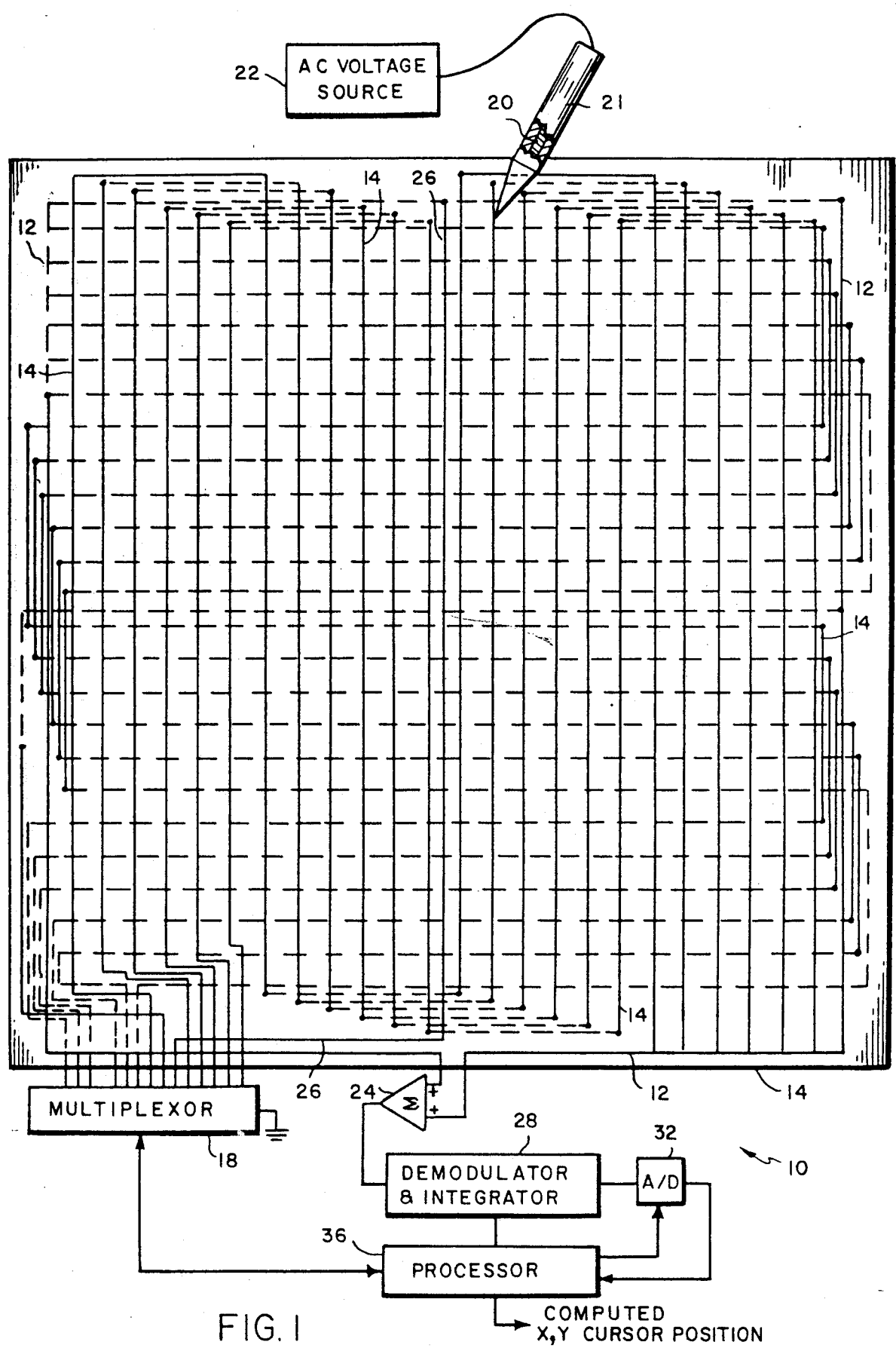
FIG. 1 is a schematic view of the digitizing tablet of the present invention.

Turning now to the drawings, FIG. 1 is a simplified schematic representation of the digitizing tablet 10. The tablet is formed on a flat surface. The surface may be provided on a rigid printed circuit board or preferably a flexible plastic sheet made from a polycarbonate for example. A two-dimensional work surface is located inside a conductive loop 12 which surrounds the work surface. The surrounding conductive loop 12 is provided beneath the work surface so as not to be exposed where scratching may deteriorate the conductivity of the line. Also beneath the work surface are provided a plurality of grids, each formed by a circuitous conductive line. In accordance with the preferred embodiment, six circuitous conductive lines 14 are provided in determining the X coordinate on the work surface and six circuitous lines 16 are provided for determing the Y coordinate on the work surface. So that conductive lines in the tablet can cross one another without making contact, multiple layers may be used in the circuit board or plastic sheet. Two layers are illustrated in FIG. 1, the dashed lines showing the conductive lines in the bottom layer.

Figure 2:
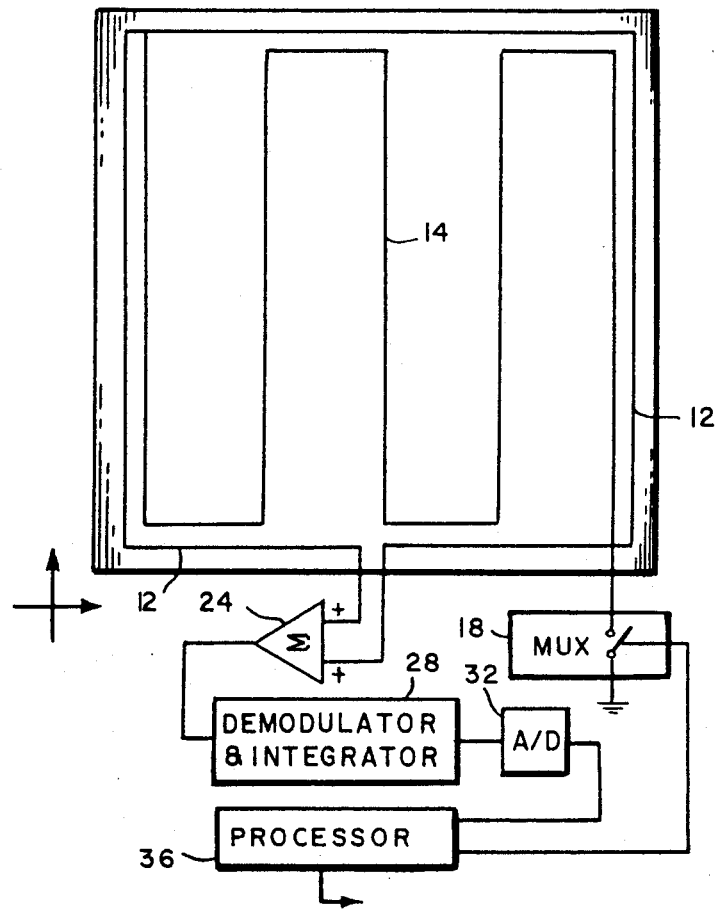
FIG. 2 is an isolated schematic of a single grid from the digitizing tablet of FIG. 1.

A grid formed by a single circuitous line is shown in FIG. 2. The grids are the same for either the X or Y direction. The circuitous conductive line forms a series of conductive loops which are of equal size and are adjacent to one another covering the surface area of the work surface. Each of the six grids provide the same pattern of adjacent loops, but the grids are offset from one another. Each of the circuitous conductive lines has one end connected to the surrounding conductive loop 12 and another end which is free. The free end of each of the circuitous grids is connected to a multiplexor 18. The multiplexor 18 selectively connects each individual grid to ground.

A stylus 21 having a conductive coil 20 is used as a position indicating implement over the work surface. The conductive element 20 is connected to an AC voltage source 22. This causes the coil 20 to produce a magnetic field which induces voltage or current in the grids on the work surface when the grids are grounded. While this invention is described in terms of driving a current into a conductive coil 20 and detecting the induced voltage or current in the tablet, equivalent performance can be achieved by driving a current in the tablet and sensing the induced voltage or current in the coil.

The presently preferred stylus includes a coil wrapped around a ferrite cylinder. The cylinder is 0.9 inches long and 0.25 inches in diameter. The cylinder is hollow having a cylindrical 0.1 inch diameter hole through its center. The coil extends 0.5 inches along the ferrite cylinder and is centered, leaving 0.2 inches bare at either end. The tip of the stylus is 0.4 inches from the nearest end of the ferrite cylinder. It is also acceptable for the coil 20 to be placed in a puck or other suitable position indicating implement instead of a stylus.

The surrounding loop 12 has two leads. An induced signal from the position indicating implement can be measured between the grounded grid wire and either or both of the leads. The presently preferred method is to use both leads. Both leads of the surrounding loop 12 are fed into a summation amplifier 24. By using both leads, the output signal represents the sum of all the coupled current in all of the loops formed by the grid. This includes both the positive and negative contributions to current.

As a coil 20 is moved from left to right across the work surface, the voltage induced in a grid such as that of FIG. 2 varies. For the grid of FIG. 2, the induced voltage would approximately form a wave as that shown in FIG. 3. Since the circuitous conductive line winds its way back and forth across the work surface, the direction of current in any given parallel loop formed by the grid alternates from clockwise to counterclockwise thereby each loop alternatively provides either a positive or negative contribution to the composite coupling factor between the conductive coil 20 and the grid 14.

Figure 3:
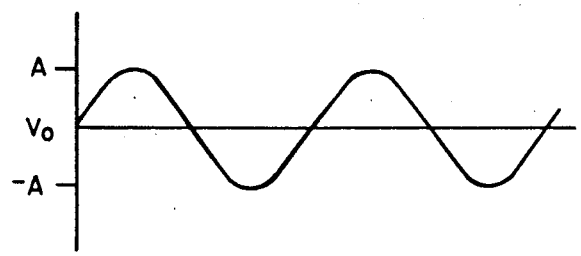
FIG. 3 is a graph of voltage versus position as a position indicating coil is moved across the grid of FIG. 2.
Figure 4:
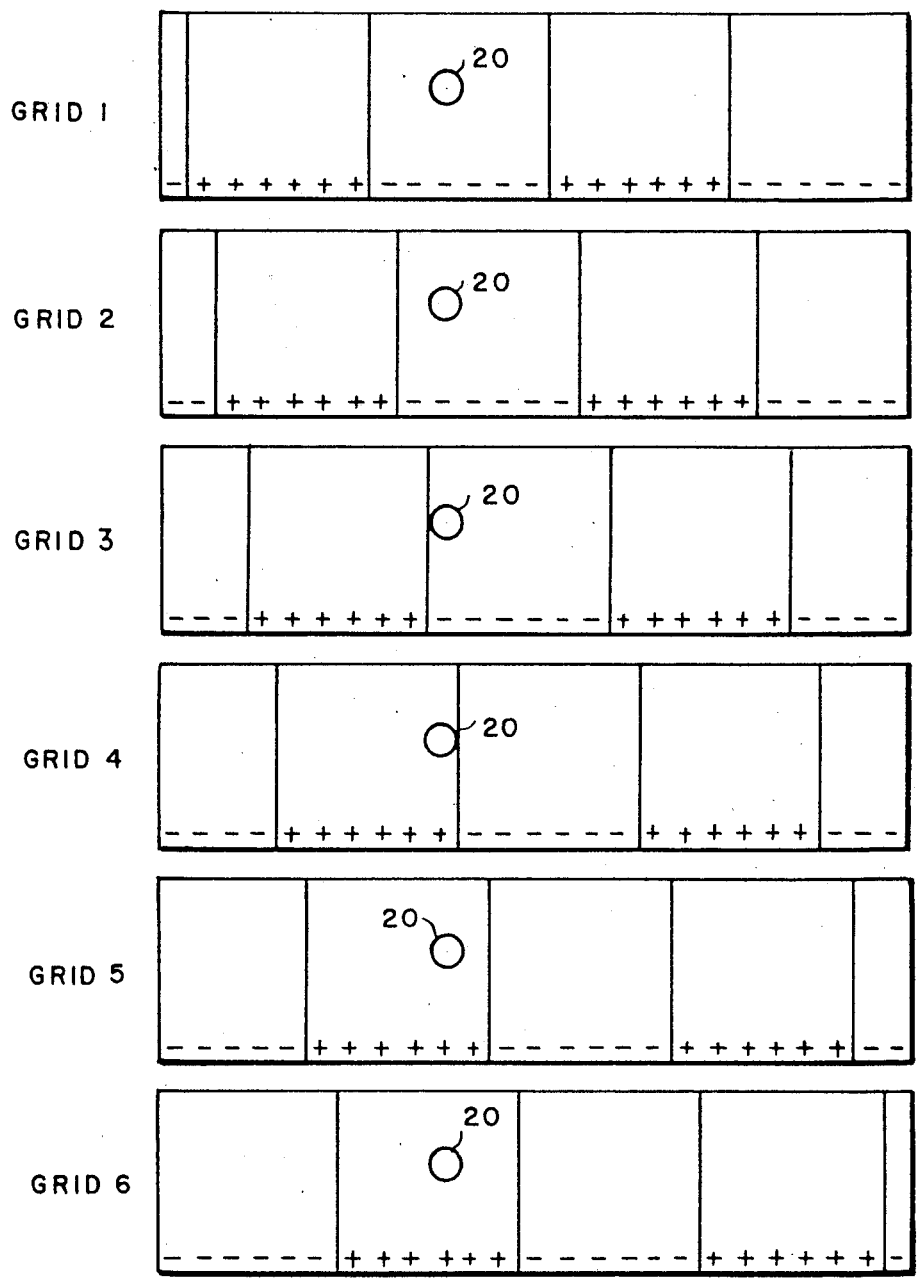
FIG. 4 provides a mathematical representation of the six grids in a single coordinate of the digitizing tablet of the present invention.

The representation of the waves shown in FIG. 3 can be simplified by simply providing a series of plus signs or minus signs in alternate loops. Such a numerical representation is presented in FIG. 4 to help describe the principles of operation of the present invention. In determining the position of an electric coil over the work surface, data signals are taken for each of the grids in the digitizing tablet. The multiplexor 18 cycles through each grid sequentially connecting each one to ground. The present embodiment cycles through all of the grids on the tablet 100 times per second, but this repetition rate may be made higher or lower depending upon the application. Since each of the grids in a single coordinate is offset from one another, the relationship between voltage of the output signal and position of the coil differs for each grid, as shown by the mathematical representations in FIG. 4. FIG. 4 shows a coil 20 arbitrarily placed on the work surface. The representation indicates that the coil 20 in this position would provide a negative contribution to grid 1, grid 2 and grid 3 and provide a positive contribution to the signals at grid 4, grid 5 and grid 6.

The summation signal from the summation amplifier 24 for each grid is fed into a demodulator and integrator 28. Because the coil 20 is often provided with a high frequency alternating signal, the data can best be extracted by first using amplification and then a form of demodulation. One acceptable form of demodulation is the demodulator and integrator 28 as described in U.S. Pat. No. 4,644,102 (Blesser, et al.), the disclosure of which is hereby incorporated by reference herein. Another possible form of demodulation is the use of an ordinary rectifier. In either case, there is created a DC voltage signal which becomes the data.

When, as in the preferred embodiment, processing is performed in a microprocessor, the signal from the demodulator and integrator 28 is provided to an analog to digital converter 32. The analog to digital converter 32 provides digital data signals to a processor 36.

The processor 36 is responsible for taking the signals from all of the grids and determining from those signals the X and Y position of the coil. Depending on the size of the tablet, the twelve circuitous grids 14 may be insufficient to provide an unambiguous position. In the embodiment described, the grids determine position accurately within a quadrant of the tablet but are unsure as to which quadrant the coil is in. Therefore, a coarse detection mechanism is added to the tablet. Any of the many well known position detection methods may be selected for this coarse position detection. The present embodiment uses a single cycle grid 26 in each coordinate to determine whether the coil is to the right or left and top or bottom. The grid leads for the coarse position detection are fed into the multiplexor 18 and are read in the same manner as the other twelve grids.

In accordance with the present invention, the processor is provided with firmware, i.e., a program in ROM for translating each of the digital signals from the grids into a data signal representative of the position of the tip of the stylus 21 in the X or Y coordinate. This is done by feeding the signals through one or more linear spatial filters. The linear spatial filters produce intermediate signals which can be directly converted through a nonlinear filter into raw X and Y position signals. Further in accordance with the present invention, at least two sets of linear spatial filters are used which produce at least two raw X and Y position signals which can be combined to give the true X and Y position signals.

Figure 5:
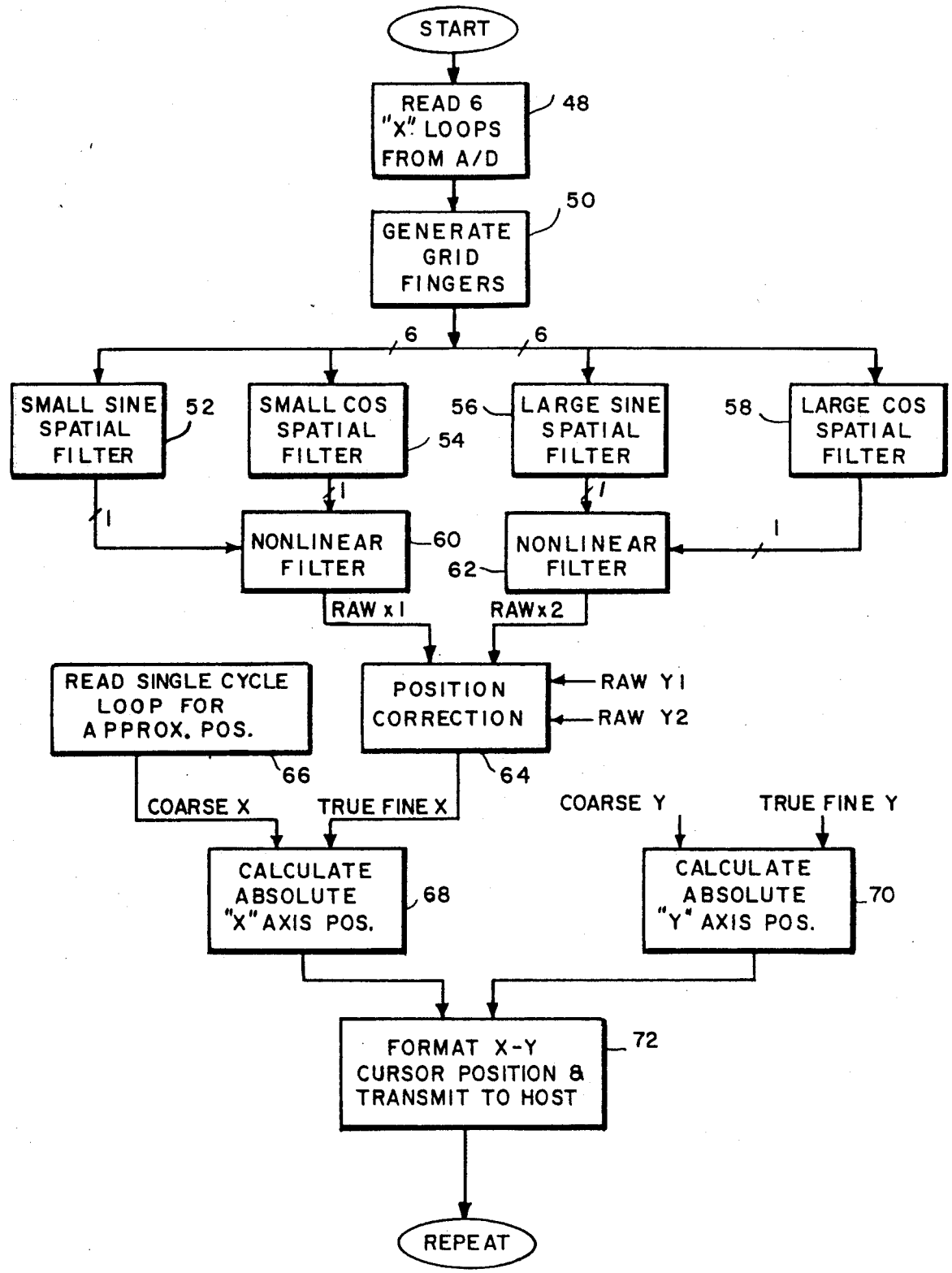
FIG. 5 is a block diagram of the functions performed within the processor of the digitizing tablet of the present invention.

Referring now to FIG. 5, a flow chart of the operations performed by the processor is given. The flow chart is shown for the X coordinate. The Y coordinate is determined by a symmetrically identical process. The six digital signals from the six X-coordinate grids are read in block 48 by the processor 36. Each signal is a number representative of the amplitude coupling factor between the coil 20 and the surrounding loop 12 when the corresponding grid is grounded by the multiplexor 18. The sign and size of the signal depends on where the coil 20 is locate relative to the various loops formed by the grid and whether a loop provides a positive or negative contribution to the signal as illustrated in FIG. 4.

The six signals are fed into a first spatial filter. The first filter is called a finger generation spatial filter 50. The coefficients used are either +1 or −1. Therefore, it is only necessary to change the sign if −1 is the coefficient and in neither case is any multiplication required. The resulting numbers are then added in pairs of two to form six new finger values which are representative of the coupling factors in what are called herein "fingers" of sensitivity. Large regions of insensitivity are ignored by each of these new values. The six finger values are generated by the operations shown below. The mathematical representations from FIG. 4 are used below to illustrate the areas of sensitivity and insensitivity for each of the new fingers.

```
FINGER GENERATION
FINGER 1 = (GRID 1 − GRID 2)/2
GRID 1 +     −1 1  1  1  1  1  1−1−1−1−1−1−1 1 1  1  1  1  1−1−1−1−1−1−1
(−GRID 2)     1 1−1−1−1−1−1−1 1  1  1  1  1 1−1−1−1−1−1−1 1  1  1  1  1
FINGER 1      0 2  0  0  0  0 0−2  0  0  0  0 0 2 0  0  0  0 0−2 0  0  0  0  0
FINGER 2 = (GRID 2 − GRID 3)/2
GRID 2 +     −1−1 1  1  1  1  1−1−1−1−1−1−1 1 1  1  1  1  1−1−1−1−1−1 1
(−GRID 3)     1 1 1−1−1−1−1−1−1  1  1  1  1 1 1−1−1−1−1−1−1 1  1  1  1
FINGER 2      0 0 2  0  0  0  0 0−2  0  0  0  0 2 0  0  0  0 0 0−2 0  0  0  0
FINGER 3 = (GRID 3 − GRID 4)/2
GRID 3 +     −1−1−1 1  1  1  1  1−1−1−1−1−1−1 1 1  1  1  1  1−1−1−1−1−1
(−GRID 4)    +1 1 1 1−1−1−1−1−1−1  1  1  1  1 1 1−1−1−1−1−1−1 1  1  1
FINGER 3      0 0 0 2  0  0  0 0−0−2  0  0  0  0 2 0  0  0  0 0 0−2 0  0  0
FINGER 4 = (GRID 4 − GRID 5)/2
GRID 4 +     −1−1−1−1 1  1  1  1  1−1−1−1−1−1−1 1 1  1  1  1  1−1−1−1
(−GRID 5)     1 1 1 1 1−1−1−1−1−1−1  1  1  1  1 1 1−1−1−1−1−1−1 1  1
FINGER 4      0 0 0 0 2  0  0  0 0−2  0  0  0  0 2 0  0  0  0 0 0−2 0  0
FINGER 5 = (GRID 5 − GRID 6)/2
GRID 5 +     −1−1−1−1−1 1 1  1  1  1−1−1−1−1−1−1 1 1  1  1  1  1−1−1−1
(−GRID 6)     1 1 1 1 1 1−1−1−1−1−1−1  1  1  1  1 1 1−1−1−1−1−1−1 1
FINGER 5      0 0 0 0 0 2 0  0  0  0 0−2  0  0  0  0 2 0  0  0  0 0 0−2 0
FINGER 6 = (GRID 6 + GRID 1)/2
GRID 6       −1−1−1−1−1−1 1  1  1  1  1−1−1−1−1−1−1 1 1  1  1  1  1−1
(GRID1)      −1 1 1 1 1 1 1−1−1−1−1−1−1  1  1  1  1 1 1−1−1−1−1−1−1
FINGER 6     −2 0 0 0 0 0 2  0  0  0  0 0−2  0  0  0  0 2 0  0  0  0 0 0−2
```

Referring again to the coil as illustrated in FIG. 4, the coil will provide a negative contribution to grid 1 and a negative contribution to grid 2. Thus, when finger value 1 is computed by adding minus grid 2 to grid 1 in the linear spatial filter, finger 1 comes out with a 0 result. The coil is in a region where finger value 1 is insensitive. On the other hand, if we refer to finger value 3, here the coil provides a negative component to grid 3 and a positive component to grid 4. When minus grid 4 is added to grid 3, a negative component results in finger value 3 since the coil is positioned over one of finger value 3's sensitive fingers. It can be seen from the mathematical representation that the finger pattern repeats itself, therefore, a negative component in finger 3 may come from one of several sensitive finger regions. Thus, it is seen that in accordance with the presently preferred embodiment, the finger generation spatial filter operates by subtracting neighboring grids from one another. Grids 1 and 6, due to the physical layout, are added to produce a full set of finger values.

The resulting six finger values are fed into two pairs of linear spatial filters. Each of these filters produces an intermediate position signal. The first set of linear spatial filters includes a small sine spatial filter 52 and a small cosine spatial filter 54. The small sine linear spatial filter combines finger values 1, 3 and 5 to form one result. The small sine filter is shown below as finger 1 minus finger 3, plus finger 5. The position sensitivity is shown below when the fingers are combined in this manner. As can be seen, a sine pattern emerges.

```
SINE = FINGER 1 − FINGER 3 + FINGER 5
FINGER 1 −  0 2 0  0 0 0 0 −2 0 0 0  0 0 2 0  0 0 0 0 −2 0 0 0  0 0
```

-continued

| SINE = FINGER 1 − FINGER 3 + FINGER 5 | |
|---|---|
| FINGER 3 + | 0 0 0  −2 0 0 0  0 0 2 0  0 0 0 0  −2 0 0 0  0 0 2 0  0 0 |
|  | 0 2 0  −2 0 0 0  −2 0 2 0  0 0 2 0  −2 0 0 0  −2 0 2 0  0 0 |
| FINGER 5 | 0 0 0  0 0 2 0  0 0 0 0  −2 0 0 0  0 0 2 0  0 0 0 0  −2 0 |
| SINE | 0 2 0  −2 0 2 0  −2 0 2 0  −2 0 2 0  −2 0 2 0  −2 0 2 0  −2 0 |

The small cosine linear filter takes finger value 2, minus finger 4, plus finger 6. The position sensitivity resulting in a cosine pattern is shown below.

| CONSINE = FINGER 2 − FINGER 4 + FINGER 6 | |
|---|---|
| FINGER 2 − | 0 0 2 0  0 0 0 0  −2 0 0 0  0 0 2 0  0 0 0 0  −2 0 0 0  0 |
| FINGER 4 + | 0 0 0 0  −2 0 0 0  0 0 2 0  0 0 0 0  −2 0 0 0  0 0 2 0  0 |
|  | 0 0 2 0  −2 0 0 0  −2 0 2 0  0 0 2 0  −2 0 0 0  −2 0 2 0  0 |
| FINGER 6 | −2 0 0 0  0 0 2 0  0 0 0 0  −2 0 0 0  0 0 2 0  0 0 0 0  −2 |
| COSINE | −2 0 2 0  −2 0 2 0  −2 0 2 0  −2 0 2 0  −2 0 2 0  −2 0 2 0  −2 |

Figure 6:
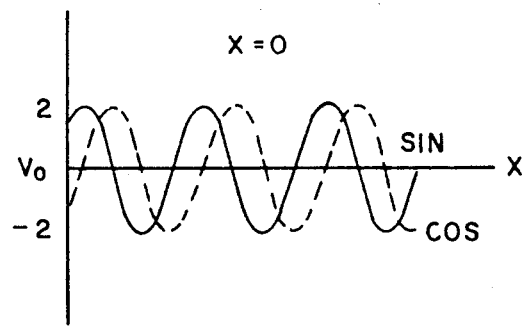
FIG. 6 is a graph of voltage versus position for the small sine and cosine intermediate signals produced within the present invention.

Graphically the sensitivity of the two intermediate results to position are illustrated in FIG. 6.

Figure 7:
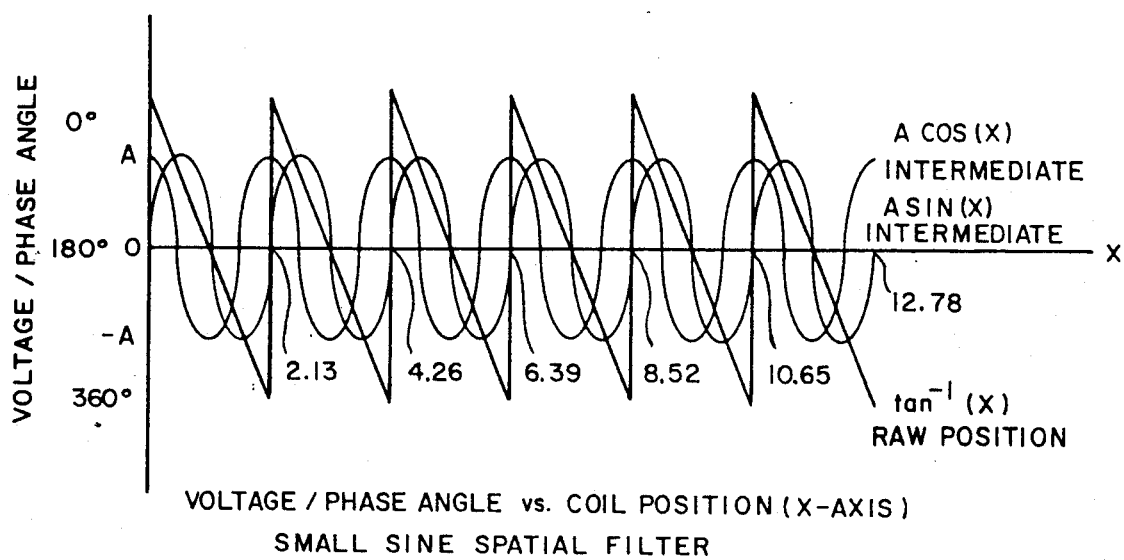
FIG. 7 is a graph of voltage versus position for the arc tangent function performed on the small sine and cosine intermediate signals in the present invention.

The two intermediate numbers from the small sine and cosine filters then combine using a nonlinear filter 60. The preferred filter performs a function simulating the arc tangent function to produce a raw position number. The resulting raw position number is proportional to position of the stylus but has an ambiguity since it repeats, as often as the fingers did. In the presently preferred embodiment of a 12.78 inch tablet, this function repeats every 2.13 inches. We have called this raw position result the small sine raw position. The small sine raw position is shown graphically as position versus amplitude in FIG. 7.

The second set of linear spatial filters include a large sine filter 56 and a large cosine filter 58. These filters produce a second set of intermediate numbers which are combined to arrive at a second raw position number. In these filters, each finger value is multiplied by a predetermined number and the results are added. While there are an infinite number of possible coefficients, those chosen herein have a fixed spatial frequency to produce a spatial bandpass transfer function. These coefficients are themselves the values of a sine function for the large sine filter 56 and the coefficients of a cosine function for the large cosine filter 58. The following table is an example of the coefficients used:

| Sine Coef | Cosine Coef | Finger |
|---|---|---|
| 0.0 | 1.0 | 1 |
| 0.5 | 0.866 | 2 |
| 0.866 | 0.5 | 3 |
| 1.0 | 0.0 | 4 |
| 0.866 | −0.5 | 5 |
| 0.5 | −0.866 | 6 |

Figure 8:
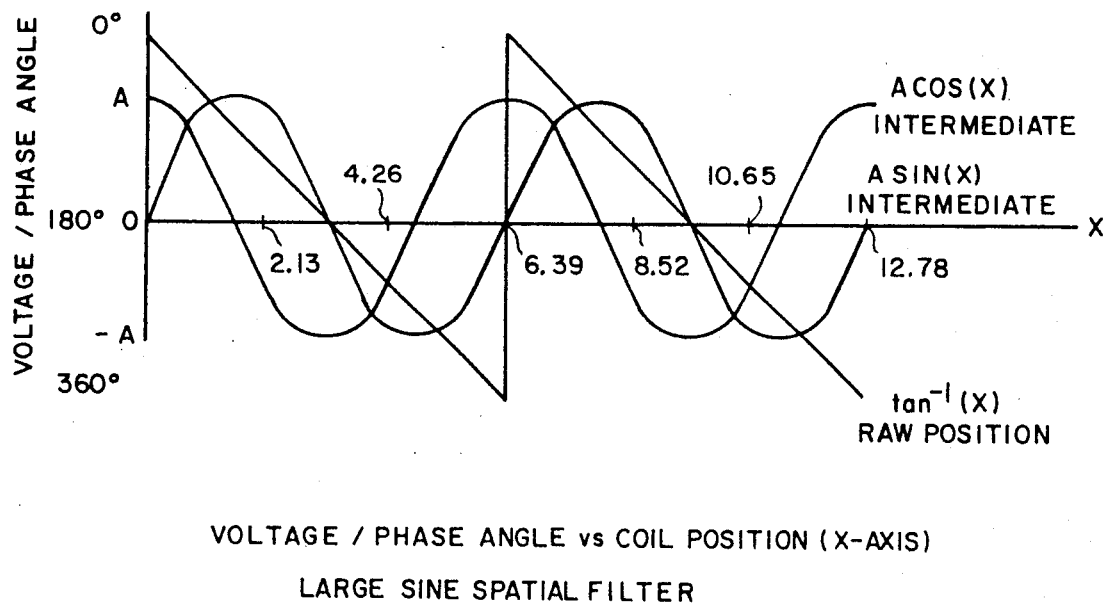
FIG. 8 is a graph of voltage versus position for the arc tangent function performed on the large sine and cosine intermediate signals produced in the present invention.

Notice that these coefficients are the sine and cosine values for 0, 30, 60, 90, 120 and 150 degrees. The value of each finger is multiplied by its respective coefficient and all of these are summed to produce an intermediate number. The intermediate numbers from the large sine filter and the large cosine filter are combined in a nonlinear arc tangent filter 62 to generate a second raw position number. The relationship of the numbers from the large sine filter 56, large cosine filter 58 and their respective non linear filter 62 with respect to coil position are shown in FIG. 8. The result of the non-linear filter in this case has a repeat rate which is three times smaller than that of the small sine raw position. Thus, we call this second position signal the large sine raw position. In accordance with the tablet of the presently preferred embodiment, the small sine position has a repeat rate of about 2.13 inches while the large sine position repeats at a 6.39 inch rate.

The present invention has advantageously calculated two raw position numbers. Although the small sine position has an ambiguity of about two inches, the large sine position can be used to easily resolve it. The advantage of using the two different methods of position determination is so that certain errors can be cancelled. In practice, the spatial filters do not react perfectly. The results from the arc tangent filters are not truly linear. The linearity error degrades performance. While it is possible to minimize the errors by suitable choice of coil size, coil location in the stylus or use of a ferrite core, human comfort require that the tip portion of the stylus have a small diameter thereby putting restrictions on coil size and location. Thus, the use of two sets of spatial filters are desirable for their achievement of improved performance. This is especially true for making the position output signals independent of tilt of the position indicating implement.

One advantage of using the linear spatial filters is that they can be used flexibly to produce different intermediate signals with differing properties. In accordance with the preferred embodiment, two sets of intermediate signals are provided in each coordinate, each set providing a different response to the tilt of the stylus. It is desirable that the difference between the responses of the two sets of linear filters to tilt be maximized. In the presently preferred embodiment, the two sets of filters respond in opposite directions to tilt. By using both sets of intermediate signals, a final result can be derived which is relatively insensitive to tilt.

The small sine raw positions and large sine raw positions for both coordinates are applied to a position correction table 64 to arrive at an accurate position irrespective of tilt. The position correction table is empirically determined using computer simulations of the stylus at different tilt angles. The difference in raw position determined by the small sine and the large sine is used to remove the effect of tilt on the reported position.

For the presently preferred embodiment, the correction table is given below. Each successive column represents a shift of 0.1 inches in the absolute value of the small sine X position minus the large sine X position. Each successive row represents a shift of 0.1 inches in the absolute value of the small sine Y position minus the large sine Y position. The same correction table is used for calculating true values in both X and Y. The resultant correction numbers given by the table are given in mils (thousandths of an inch). For the true fine X position, the resultant from the table is added to the raw small sine X position to obtain the true fine X position if the small sine raw position minus the large sine raw position is positive. If the small sine raw position is negative, then the resultant is subtracted from the raw small sine X position. Best accuracy is obtained by using interpolation to obtain the correction number for differences which are not exactly expressed in tenths of an inch.

CORRECTION TABLE

| | ABS (SMALL SINE RAW X - LARGE SINE RAW X) | | | | | | |
|---|---|---|---|---|---|---|---|
| | 0 | .1 | .2 | .3 | .4 | .5 | .6 |
| ABS (SMALL | 0 | .1 | .2 | .3 | .4 | .5 | .6 |
| SINE RAW Y − 0 | 0 | 58 | 118 | 170 | 222 | 262 | 262 |
| LARGE .1 | 0 | 60 | 112 | 166 | 228 | 256 | 256 |
| SINE RAW Y) .2 | 0 | 50 | 96 | 156 | 204 | 242 | 242 |
| .3 | 0 | 48 | 84 | 142 | 190 | 208 | 208 |
| .4 | 0 | 28 | 64 | 102 | 160 | 190 | 190 |
| .5 | 0 | 30 | 50 | 100 | 140 | 160 | 160 |
| .6 | 0 | 30 | 50 | 100 | 140 | 160 | 160 |

The two pairs of raw X and raw Y values may be used to report the angle of the tilt. The angle in X is proportional to small sine raw X minus large sine raw X. The tilt angle in the Y direction is proportional to small sine raw Y minus large sine raw Y. This calculation may be useful if the stylus is being used as a joystick where tilt is an important reading. In connection with the tablet of the present invention, it is preferred that the coil location in a writing implement be optimized to maximize rather than minimize the difference in raw position numbers obtained during tilt.

Figure 9:
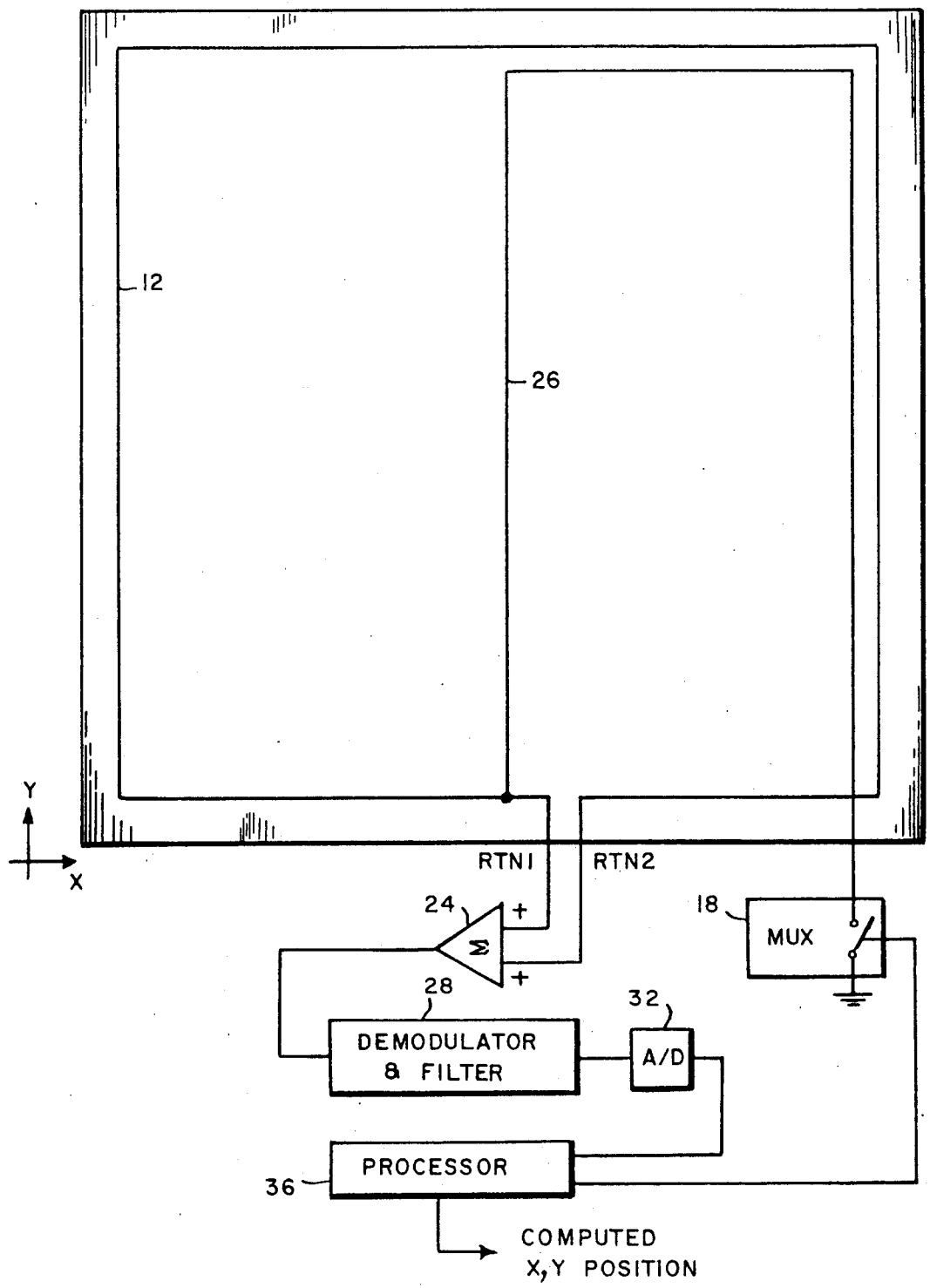
FIG. 9 is a schematic of a coarse position detection grid for use with the present invention.

The above description of the present invention provides position detection relatively insensitive to tilt over about a six inch period. For a 12 inch by 12 inch tablet, further position determining elements will be required. However, it is only necessary that a very coarse detection method be used which has a tolerance of plus or minus three inches. This can be achieved using any of several methods. Indeed any prior art position detection method should be able to determine a position of a coil within plus or minus three inches. Hence, it is not that important which method is used. In accordance with the presently preferred embodiment, a single cycle grid whose coupling sensitivity is plus in one half of the grid and minus in the other is used. Such a grid is illustrated in FIG. 9.

A single cycle grid is provided in each coordinate one for X and one for Y. The single cycle grids are attached to the multiplexor 18 just as is done for the other 12 grids. Just as with the other grids, the output signal from a single cycle grid is taken from the surrounding loop 12. The demodulated and digitized signal is provided to the processor 36. The reading of the single cycle grid signal is shown in block 66 of FIG. 5. This gives a reading as to whether the coil is on the left or right side of the tablet. This is all the information needed to combine in block 68 with the true fine position to provide the actual position of the stylus tip. The coarse position determines which of the two possible positions indicated in FIG. 8 is the correct position. For a larger tablet, such as an eighteen inch tablet, a coarse position detection grid can be added with a 1½ cycles circuitous line, for example. This would then determine which of three possible positions is correct.

The operations for determining the values of coarse Y position and true fine Y are the same as those described herein for X. The coarse Y and true fine Y values are combined to determine the actual Y, as illustrated in block 70. In block 72, The processor 36 takes the actual X and Y positions and formats them appropriately so that they can be transmitted to and understood by a host computer. The processor then cycles through the next set of data, producing in the presently preferred embodiment, 100 actual readings of position per second. Thus, the present digitizing tablet is a useful input device for computers.

It has been shown that a position detection method insensitive to tilt is made possible in a tablet employing a single multiplexor and a single amplifier to read off the position signals from the grids. Advantageously, the electronics have been simplified so that all of the signal outputs are taken from only two leads extending from the surrounding loop. Linear spatial filters have been advantageously employed to enable two position detection methods which are responsive to tilt differently so that they can be used together to arrive at an actual position signal insensitive to the tilt.

Embodiments of the present invention are intended to be merely exemplary and those skilled in the art should be able to make numerous variations and modifications to them without departing from the spirit of the present invention. For example, the grid finger generation filter 50 could be eliminated by incorporating its function into each of the sine and cosine filters. All such variations and modifications are intended to be within the scope of the present invention as defined in the appended claims.

We claim:

1. A method for determining the position of a position indicating implement over a digitizing tablet comprising the steps of:
   reading a plurality of spatially dependent data signals from said tablet;
   determining a first raw position value from said data signals via a first algorithm;
   determining a second raw position value from said data signals via a second algorithm;
   combining the first raw position value and the second raw position value to obtain the difference between the two values;
   using the difference to obtain a correction to one of the raw position values which when combined with said one of the raw position values gives an actual position value corresponding to the position of said position indicating implement.

2. The method of claim 1 wherein said step of determining a first raw position value responds to tilt of said position indicating implement differently than said step of determining a second raw position value.

3. The method of claim 1 wherein said step of determining a first raw position value responds to tilt of said position indicating implement in an opposite fashion from said step of determining a second raw position.

4. A digitizing tablet for use with a position indicating implement having a field generating element, said tablet comprising:
   a two-dimensional work surface;
   a conductive loop surrounding said work surface and having two ends;
   a first plurality of circuitous conductive lines defining a first coordinate on said surface, each of said conductive lines having one end connected to said conductive loop and an other free end;

a second plurality of circuitous conductive lines defining a second coordinate on said surface perpendicular to said first coordinate, each of said conductive lines having one end connected to said conductive loop and an other free end;

multiplexor means having an input connected to ground which is switched from one to another of a plurality of inputs connected to the other free ends of said first and second pluralities of conductive lines;

means, connected to the two ends of said conductive loop, for receiving a pair of signals from said conductive loop induced by said field generating element and for generating an output;

modulation means for converting the output from said receiving means into direct current signals;

an analog to digital converter for digitizing said direct current signals; and processing means connected to the output of said analog to digital converter for processing signals received from said converter to produce data signals corresponding to the position of the position indicating implement in the first and second coordinates.

5. The digitizing tablet of claim 4 wherein said first and second pluralities of conductive lines each comprises six conductive lines.

6. The digitizing tablet of claim 4 further comprising a single cycle grid in said first coordinate and a single cycle grid in said second coordinate, said single cycle grids being connected to said multiplexor for providing coarse position information to said processing means.

7. A digitizing tablet for use with a position indicating implement having a field generating element, said tablet comprising:

a grid structure including a first plurality of circuitous conductive lines defining a first coordinate on said grid and a second plurality of circuitous conductive lines defining a second coordinate on said grid perpendicular to said first coordinate;

means for sampling an output signal corresponding to each of the conductive lines in said first and second pluralities of conductive lines, said output signals being induced by said field generating element;

processing means, including at least two sets of linear spatial filters, for converting the output signals into at least two intermediate raw position signals for each of said first and second coordinates; and means for combining each of said at least two intermediate signals to produce data signals corresponding to the position of the position indicating implement in the first and second coordinates.

8. The digitizing tablet of claim 7 wherein said position indicating implement has a tip for indicating a position on said grid structure and wherein said processing means further includes spatial filter means for generating a second pair of intermediate signals for said first plurality of conductive lines and for said second plurality of conductive lines; second means for combining each second pair of intermediate signals to produce a second set of data signals oppositely responsive to tilt of said position indicating implement from said first set of data signals; and means for combining said first set of data signals with said second set of data signals to produce true position signals corresponding to the position of the tip of the position indicating implement in the first and second coordinates irrespective of tilt of the implement.

9. A digitizing tablet for use with a position indicating implement, said tablet comprising:

a two-dimensional work surface;

a series of conductive grids for producing a plurality of spatially dependent data signals;

processing means, including at least two sets of linear spatial filters for converting said data signals into at least two raw position signals and a correction scheme for using the difference between said raw position signals to arrive at an actual position signal.

* * * * *